(12) United States Patent
Chou et al.

(10) Patent No.: US 11,371,901 B2
(45) Date of Patent: Jun. 28, 2022

(54) PRESSURE GAUGE CAPABLE OF RELEASING PRESSURE SAFELY

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 0 days.

(21) Appl. No.: 17/116,857

(22) Filed: Dec. 9, 2020

(65) Prior Publication Data

US 2021/0190621 A1    Jun. 24, 2021

(30) Foreign Application Priority Data

Dec. 20, 2019  (TW) ................................ 108147123

(51) Int. Cl.
  *G01L 19/00*  (2006.01)
  *G01L 19/10*  (2006.01)

(52) U.S. Cl.
  CPC .......... *G01L 19/0007* (2013.01); *G01L 19/10* (2013.01)

(58) Field of Classification Search
  None
  See application file for complete search history.

(56) References Cited

U.S. PATENT DOCUMENTS

| | | | |
|---|---|---|---|
| 2014/0216164 A1* | 8/2014 | Chou | G01L 7/166 73/732 |
| 2016/0076534 A1* | 3/2016 | Chou | F04B 49/10 73/168 |

* cited by examiner

*Primary Examiner* — Lisa M Caputo
*Assistant Examiner* — Nigel H Plumb

(57) ABSTRACT

A pressure gauge includes a hollow tube, a drive element, an anti-leak spring, a resilient element, and a cap. The hollow tube includes an accommodation chamber, a connector having a conduit, and a display unit. The drive element includes a protection unit, a first open segment, a second distal segment, a receiving portion, a hollow extension, and a protrusion. An anti-leak spring is received in the hollow extension of the drive element and abuts against the protrusion and the protection unit. The resilient element is received in the receiving portion. The cap includes a seat, a push bolt, and multiple passages. The accommodation chamber has a first fixing section and a second fixing section, a diameter of which is different from that of the first fixing section. The hollow tube further includes a tilted surround section and at least one discharge orifice.

7 Claims, 14 Drawing Sheets

PRESSURE GAUGE CAPABLE OF RELEASING PRESSURE SAFELY

FIELD OF THE INVENTION

The present invention relates to a pressure gauge which is capable of releasing an exceeded pressure of high-pressure airs of the air compressor by using and the at least one discharge orifice the protection unit when the pressure value reaches a maximum safe value.

BACKGROUND OF THE INVENTION

A conventional air compressor is applied to inflate airs into a tire of vehicle or an air mat, wherein a body of the air compressor has two ducts connected on an air store seat, a first duct is configured to accommodate a pressure gauge, and a second duct is applied to connect with a hose of an air nozzle. The air nozzle is coupled to an object (such as the tire) so that compressed airs are delivered into the object after starting the air compressor. The pressure gauge is configured to display a pressure of the compressed airs to inflate the object safely. The pressure gauge is mechanical gauge according a Bourdon Tube principle, so many precision components are required to cause easy damage and high maintenance cost.

To overcome above-mentioned problem, an improved pressure display device is developed, wherein the pressure display device contains a hollow tube, two protective sleeves fitted on the hollow tube, a connector, a panel and a spring which move linearly in the hollow tube, a scale ruler arranged on an outer wall of the hollow tube, and a discharge orifice, such that a push block receives the compressed airs of the air compressor the panel presses the spring and moves linearly with the spring. When an inflating pressure is more than a maximum safe value, an exceeded pressure of high-pressure airs of the air compressor is discharged out of the discharge orifice, thus obtaining inflating safety to the object.

However, an area of the discharge orifice is too small to release the exceed pressure quickly, and the discharge orifice is blocked by dusts and oil stains of the air compressor easily.

Furthermore, an end of the panel is movably connected with a receiving groove of the push block, and the other end is inserted through a receiving aperture of a respective protective sleeve, hence when the push block and the spring vibrate in a high vibration frequency of the air compressor, they remove easily, and the panel frictions with the respective protective sleeve greatly, thus causing inaccurate measuring of the pressure value. In addition, a length of a movement of the panel and a length of the scale ruler increasing an accommodation space of the pressure display device.

The present invention has arisen to mitigate and/or obviate the afore-described disadvantages.

SUMMARY OF THE INVENTION

The primary aspect of the present invention is to provide a pressure gauge which is capable of discharging an exceeded pressure of high-pressure airs of the air compressor by the at least one discharge orifice and the protection unit when the pressure value reaches a maximum safe value, thus eliminating a safety valve on the air compressor.

DETAILED DESCRIPTION OF THE PREFERRED EMBODIMENTS

Figure 2:
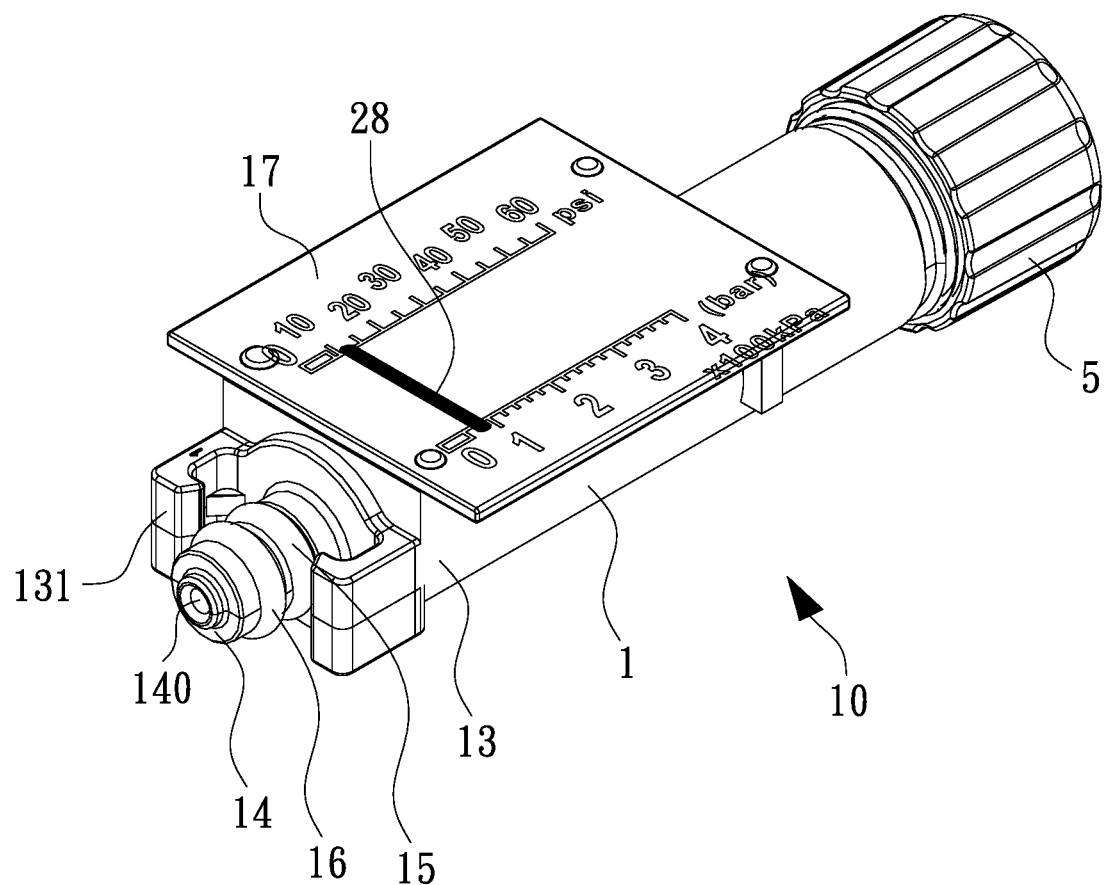
FIG. 2 is a perspective view showing the assembly of the pressure gauge according to the first embodiment of the present invention.
Figure 3:
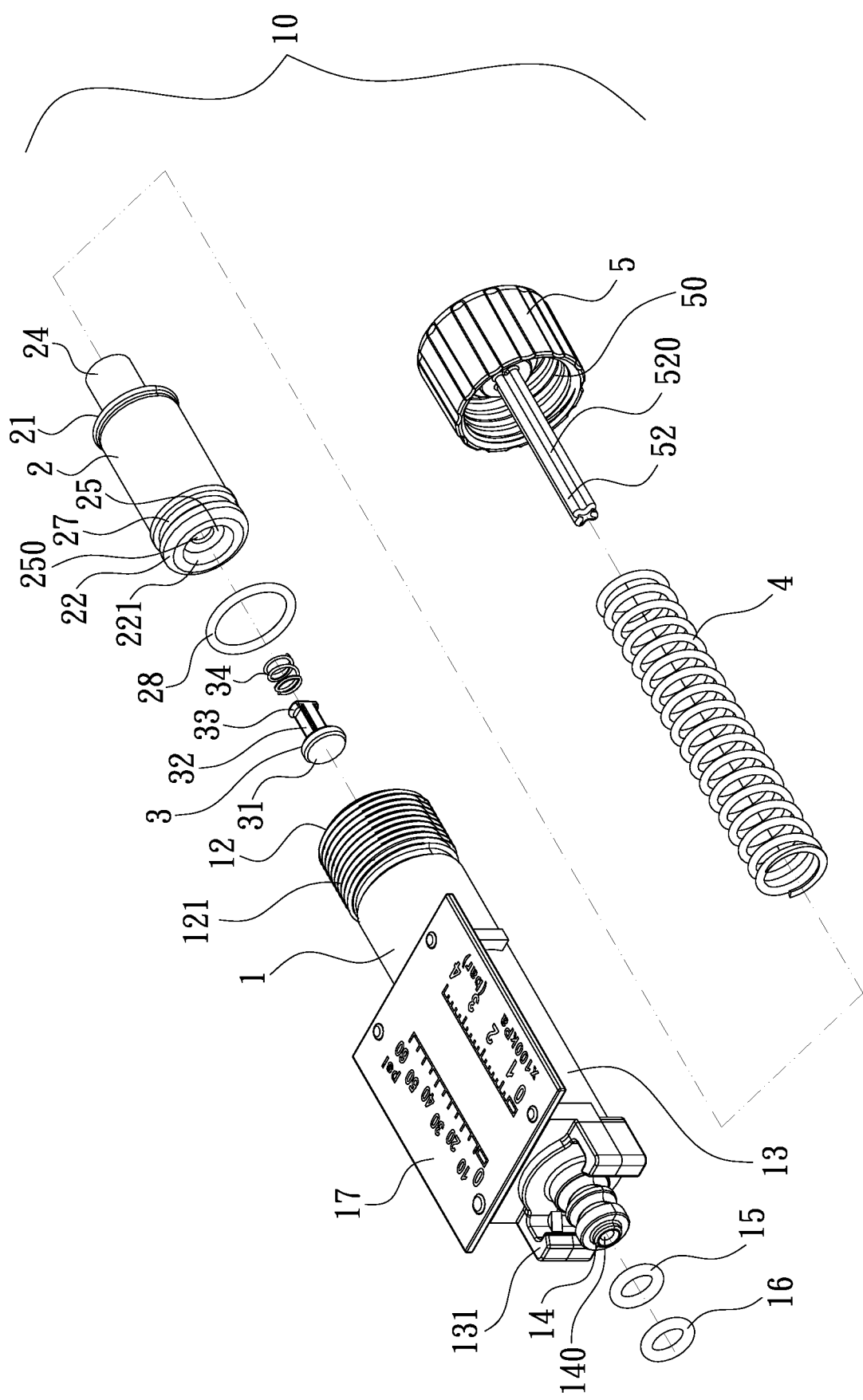
FIG. 3 is a perspective view showing exploded components of the pressure gauge according to the first embodiment of the present invention.
Figure 4:
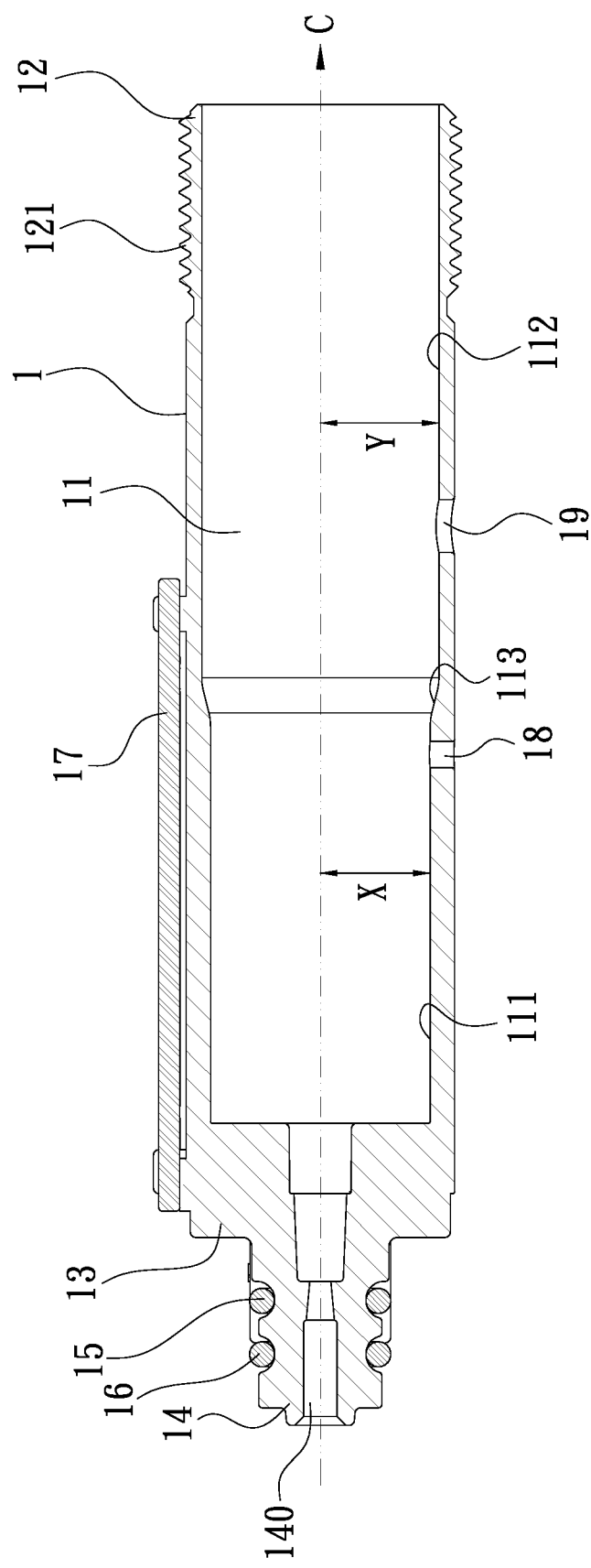
FIG. 4 is a cross sectional view showing the assembly of a hollow tube of the pressure gauge according to the first embodiment of the present invention.
Figure 7:
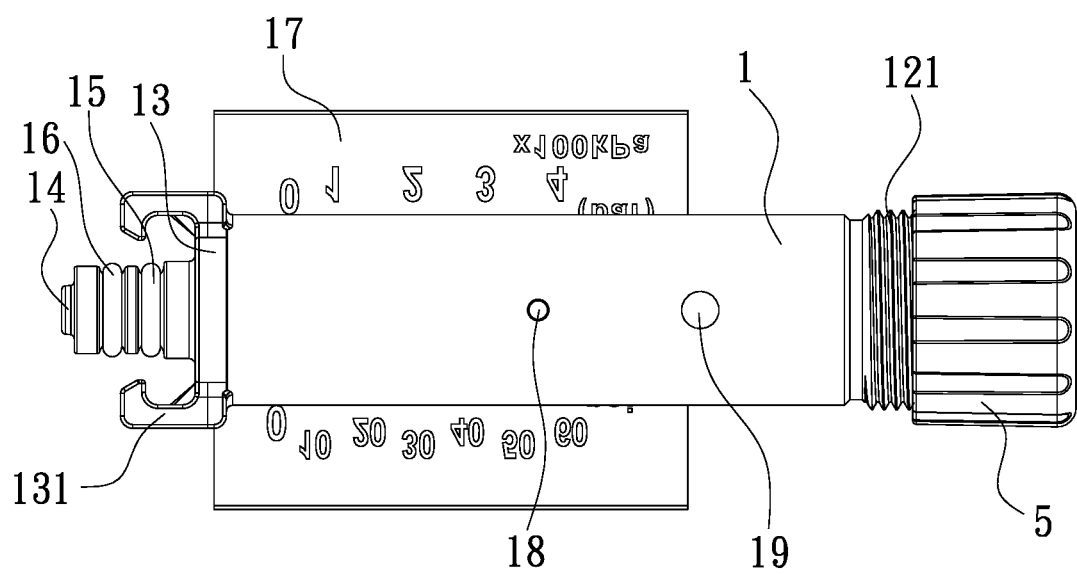
FIG. 7 is another side plan view showing the assembly of the pressure gauge according to the first embodiment of the present invention.

With reference to FIGS. 1-4, a pressure gauge 10 according to a preferred embodiment of the present invention is connected with an air compressor 9, and the pressure gauge 10 comprises a hollow tube 1 which is transparent and is formed in a cylinder shape, and the hollow tube 1 includes an accommodation chamber 11, a first open segment 12 formed on a first end of the hollow tube 1 and having male threads 121, a first distal segment 13 formed on a second end of the hollow tube 1 and having two retainers 131 formed on the first distal segment 13, a connector 14 fixed on a center of an outer side of the first distal segment 13 and having a conduit 140 which communicates with the accommodation chamber 11 of the hollow tube 1, two airtight O-rings 15, 16 separately arranged on the connector 15, and a display unit 17 mounted on an outer wall of the hollow tube 1 adjacent to the first distal segment 13 and having at least one scale graduation to indicate a pressure value of the air compressor 9, wherein the display unit 17 is detachably connected with the hollow tube 1 so as to form the pressure gauge 10. The accommodation chamber 11 of the hollow tube 1 has a first fixing section 111 and a second fixing section 112, a diameter of which is different from that of the first fixing section 111, as shown in FIG. 4, the hollow tube 1 includes a central axis C, a radius X of the first fixing section 111 is adjacent to the conduit 140, and a radius Y of the second fixing section 112 is proximate to the first open segment 12, wherein the radius X of the first section 111 is less than a radius Y of the second fixing section 112 (i.e., X<Y), a tilted surround section 113 relative to the central axis C is defined between a distal end of the first fixing section 111 and a distal end of the second fixing section 112. In this embodiment, the radius X of the first fixing section 111 increases gradually to the radius Y of the second fixing section 112, and the tilted surround section 113 is defined between the first fixing section 111 and the second fixing section 112, a peripheral wall of the surround section 113 is linear or arcuate, the hollow tube 1 further includes a first discharge orifice 18 defined on the first fixing section 111 adjacent to the surround section 113, and the hollow tube 1 includes a second discharge orifice 19 defined on the second fixing section 112 proximate to the surround section 113, as illustrated in FIGS. 4 and 7.

Figure 5:
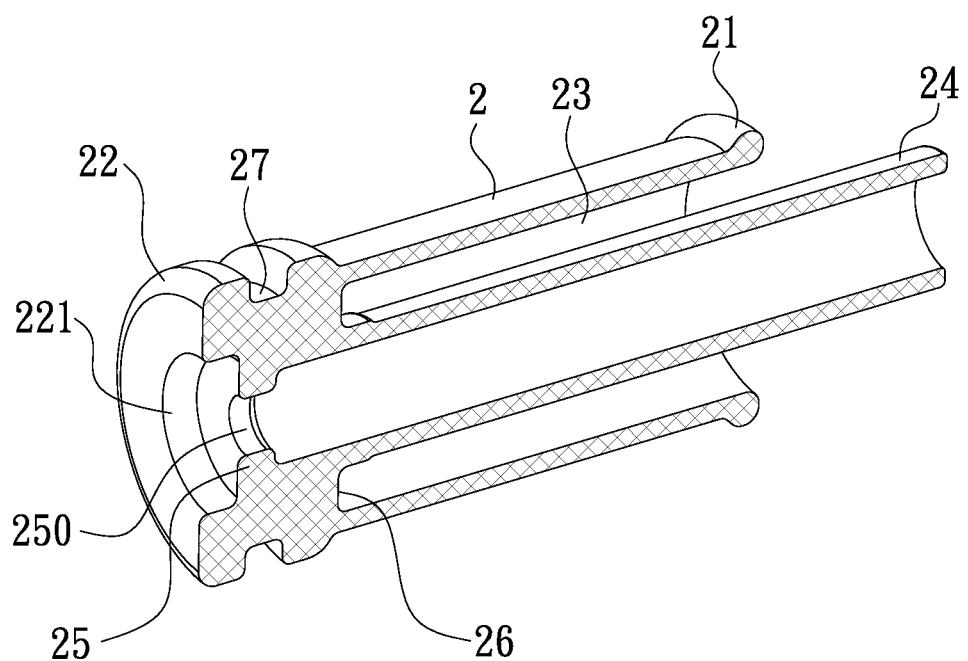
FIG. 5 is a cross-sectional perspective view showing the assembly of the drive element of the pressure gauge according to the first embodiment of the present invention.
Figure 6:
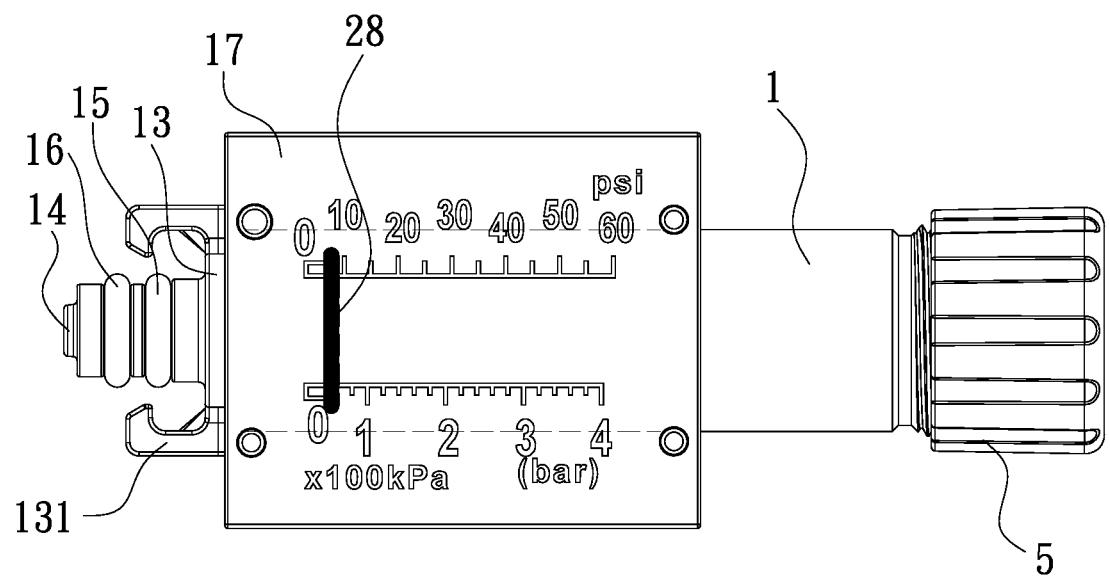
FIG. 6 is a side plan view showing the assembly of the pressure gauge according to the first embodiment of the present invention.

A drive element 2 is accommodated in the hollow tube 1 so as to move linearly after being pushed by compressed airs of the air compressor 9, such that the pressure value is indicated by using a length of movement of the drive element 2, as shown in FIG. 6. Referring to FIGS. 3 and 5, the drive element 2 includes a second open segment 21 formed on a first end thereof, a second distal segment 22 formed on a second end of the drive element 2 and having a trough 221 defined on the second distal segment 22, a receiving portion 23 defined in the drive element 2, a hollow extension 24 extending out of the second open segment 21 from a center of a bottom of the receiving portion 23 of the second distal segment 22, and a protrusion 25 formed on an inner wall of the hollow extension 24 and having an air channel 250, wherein the trough 221, the air channel 205, and the hollow extension 24 communicate with one another. The drive element 2 further includes a cavity 26 defined between a bottom of the hollow extension 24 and an inner wall of the drive element 2, a groove 27 defined around an outer wall of the second distal segment 22, and a colored O-ring 28 fitted in the groove 27.

Figure 9:
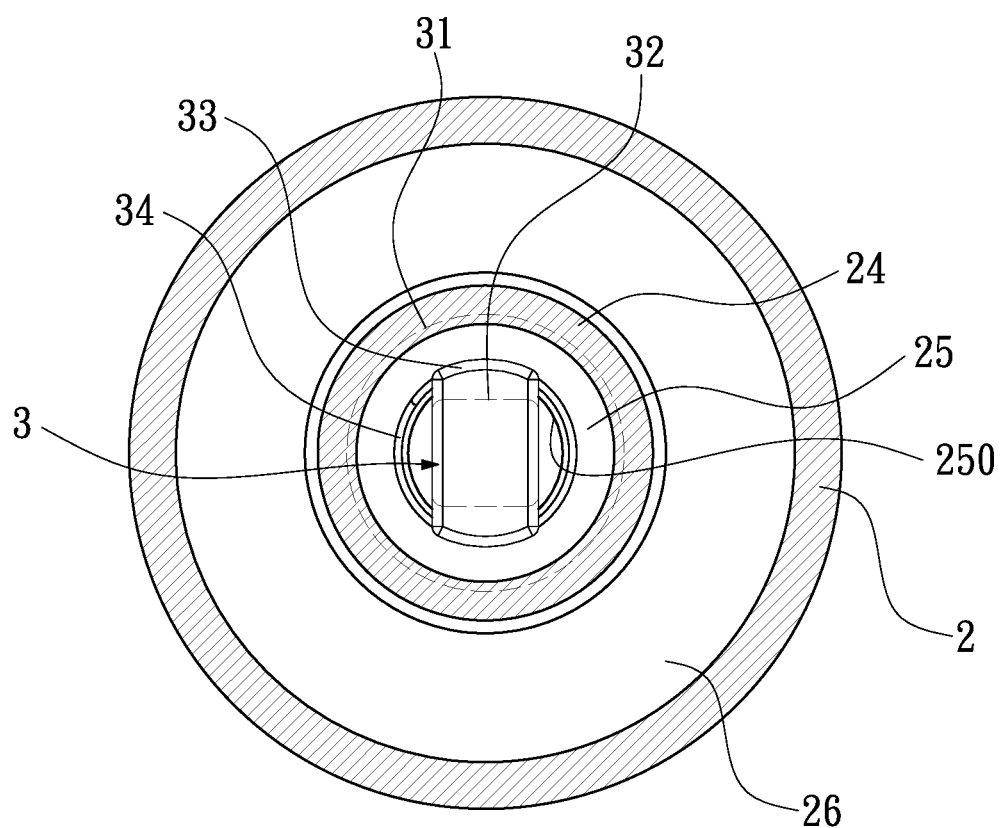
FIG. 9 is a cross sectional view showing the assembly of a part of the pressure gauge according to the first embodiment of the present invention.
Figure 10:
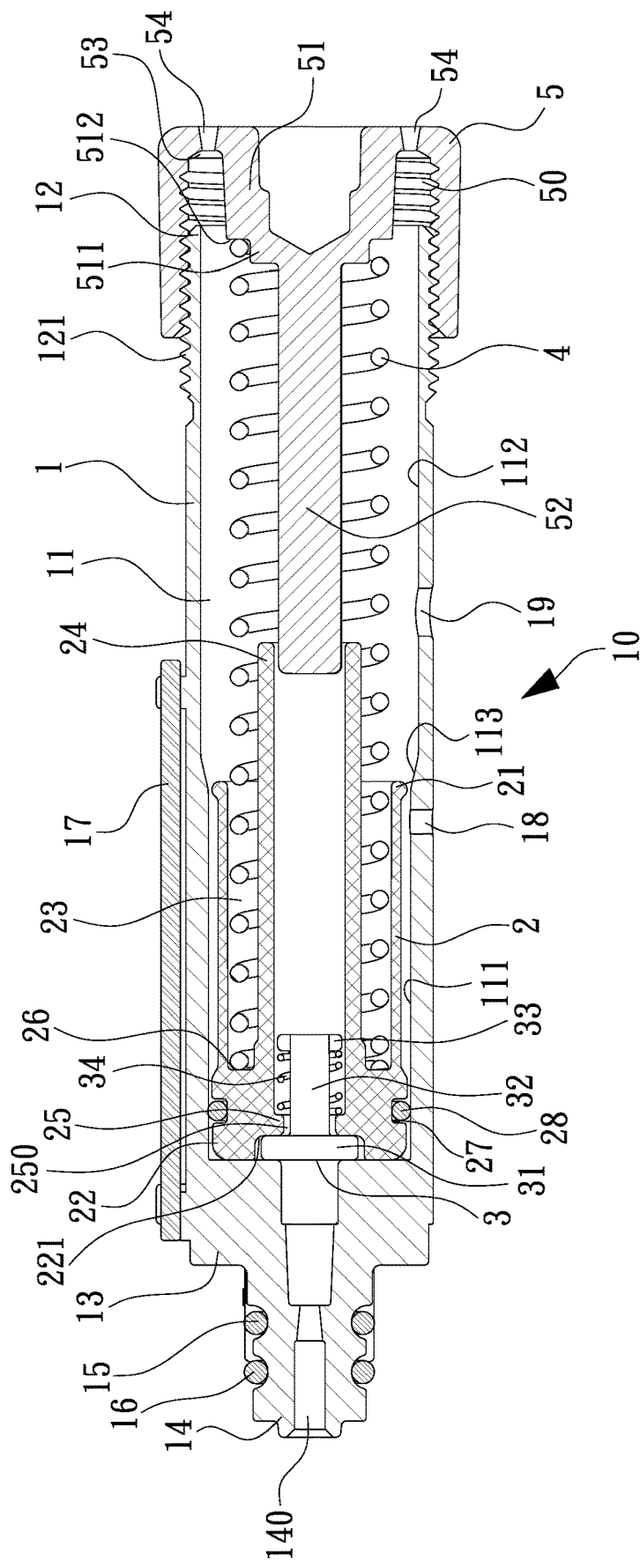
FIG. 10 is a cross sectional view showing the operation of the pressure gauge according to the first second embodiment of the present invention.

The air compressor further comprises a protection unit, in this embodiment, the protection unit is a discharge valve 3 and includes a disc 31 formed on a first end of the discharge valve 3, a post 32 extending from a second end of the discharge valve 3, two wings 33 extending from an outer end of the post 32, and an anti-leak spring 34 received in the hollow extension 24 of the drive element 2, wherein a first end of the anti-leak spring 34 abuts against the protrusion 25. The second end of the discharge valve 3 is inserted from the trough 221 of the second distal segment 22 of the drive element 2 to engage with a second end of the anti-leak spring 34 via the air channel 250 and the anti-leak spring 34, and the disc 31 of the discharge valve 3 is moved into the trough 221 of the second distal segment 22, such that the anti-leak spring 34 is fitted on the post 32 of the discharge valve 3, the first end of the anti-leak spring 34 abuts against the protrusion 25, and the second end of the anti-leak spring 34 engages with the two wings 33 of the discharge valve 3 so that the anti-leak spring 34 pushes the disc 31 of the discharge valve 3 to contact with the trough 221 of the second distal segment 22 matingly, and the disc 31 closes the air channel 250 of the drive element 2, as illustrated in FIGS. 9 and 10.

The drive element 2 is received in the hollow tube 1 after being connected with the drive element 2 so as to abut against a bottom of the accommodation chamber 11 by using the second distal segment 22, wherein the conduit 140 of the connector 14 is in communication with the accommodation chamber 11 of the hollow tube 1 so that an input pressure of an external pressure source forces the drive element 2 and the disc 31 of the discharge valve 3 via the conduit 140 and the accommodation chamber 11 of the hollow tube 1, hence the drive element 2 and the discharge valve 3 move between the first fixing section 111 and the second fixing section 112 of the hollow tube 1, as shown in FIGS. 10-13.

The air compressor further comprises a resilient element which is a driven spring 4 received in the receiving portion 23 of the drive element 2 and fitted on the hollow extension 24, wherein an end of the driven spring 4 contacts with the cavity 26.

Figure 8:
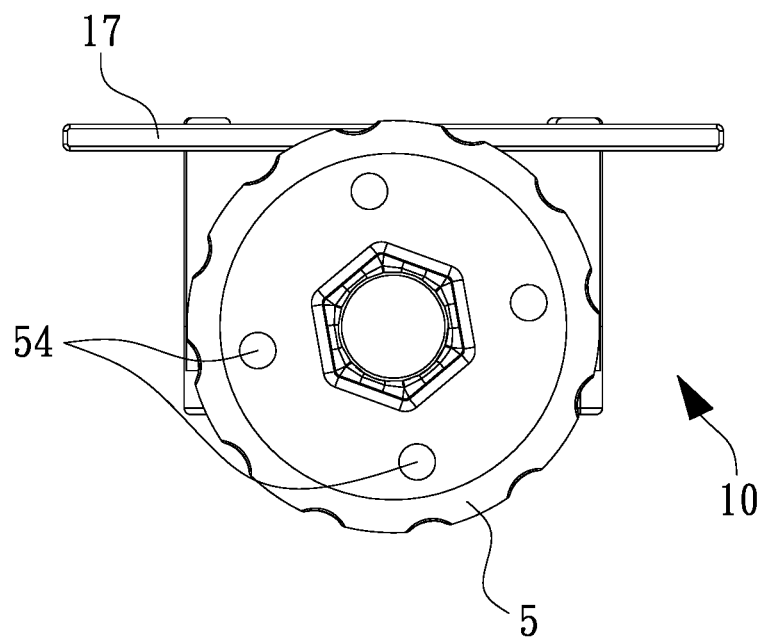
FIG. 8 is also another side plan view showing the assembly of the pressure gauge according to the first embodiment of the present invention.
Figure 13:
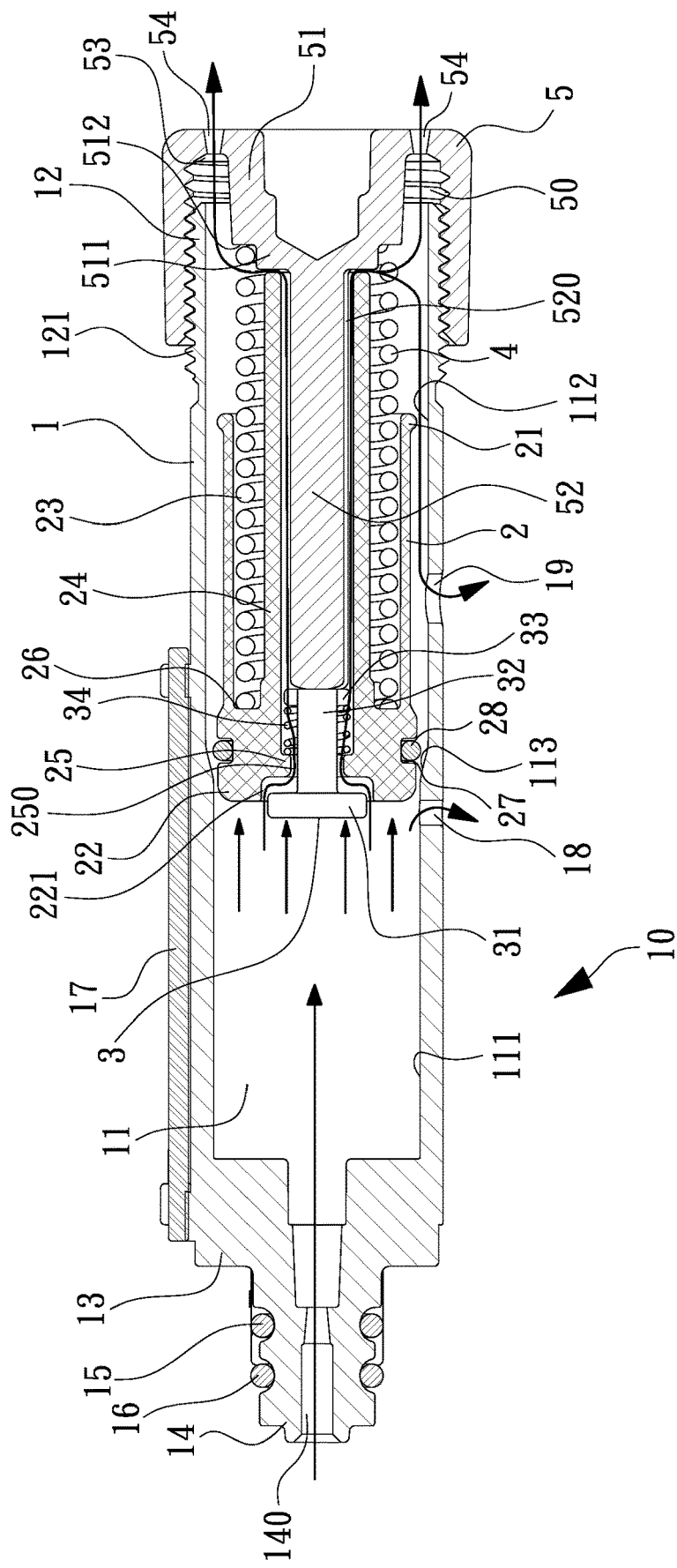
FIG. 13 is still another cross sectional view showing the operation of the pressure gauge according to the first second embodiment of the present invention.

The air compressor further comprises a cap 5, and the cap 5 includes female threads 50 formed on an inner wall thereof, a seat 51 extending from a center of an interior of the cap 5, a trench 53 defined between the seat 51 and the inner wall of the cap 5, and a push bolt 52 extending from a top of the seat 51 and formed in a cross-shaped column shape, wherein the push bolt 52 has a recess 520 defined on an outer wall thereof and a diameter which is less than a diameter of the seat 51, and a shoulder 511 is formed between the push bolt 52 and the seat 51, wherein a rib 512 is defined between the shoulder 511 and the seat 51, and the cap 5 further includes multiple passages 54 defined on an outer wall thereof, as shown in FIG. 8, such that the multiple passages 54 communicate with the trench 53 of the cap 5 to discharge the input pressure, as illustrated in FIG. 13. After the female threads 50 of cap 5 are screwed with the male threads 121 of the first open segment 12 of the hollow tube 1, a screwing depth of the hollow tube 1 and the cap 5 is configured to adjust the pressure value of the air compressor 9, wherein the other end of the driven spring 4 abuts against the rib 512 of the cap 5, and an inner wall of the driven spring 4 contacts with the shoulder 511 of the cap 5. With reference to FIGS. 2 and 3, the hollow tube 1, the drive element 2, the discharge valve 3, the colored O-ring 28, the two airtight O-rings 15, 16, the driven spring 4, and the cap 5 are connected.

Figure 1:
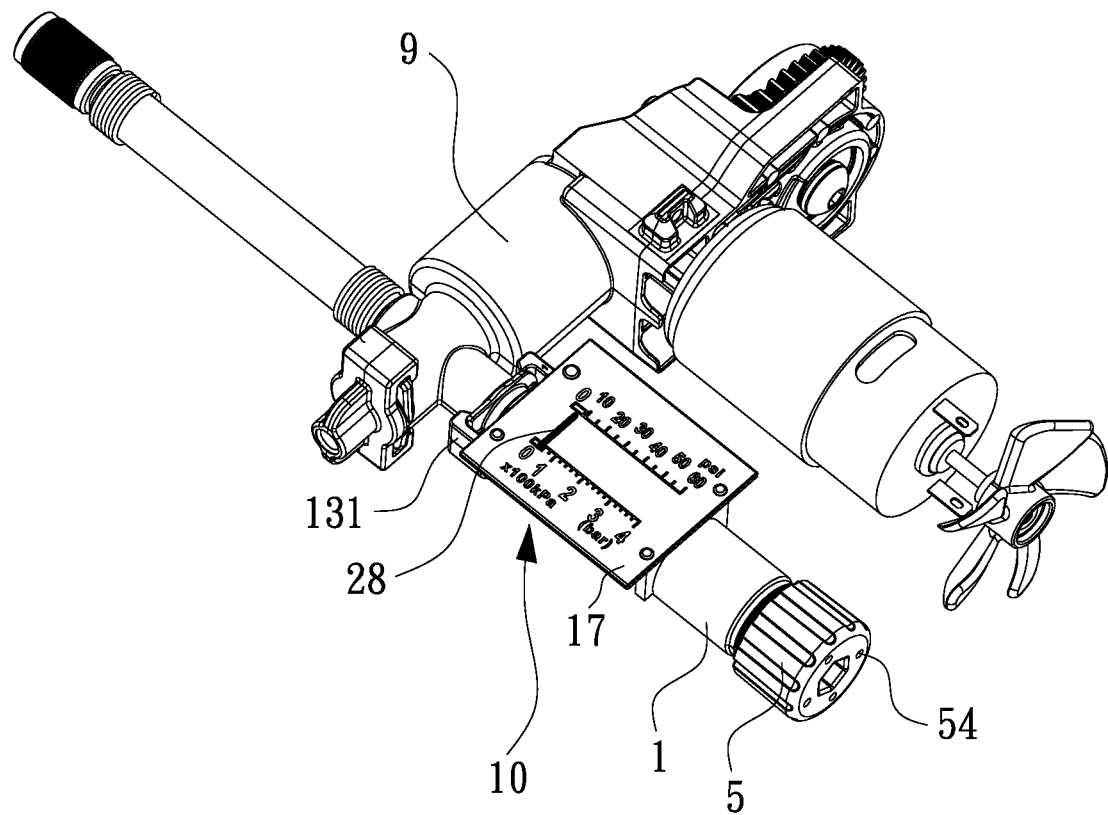
FIG. 1 is a perspective view showing the assembly of a pressure gauge with an air compressor according to a first embodiment of the present invention.
Figure 11:
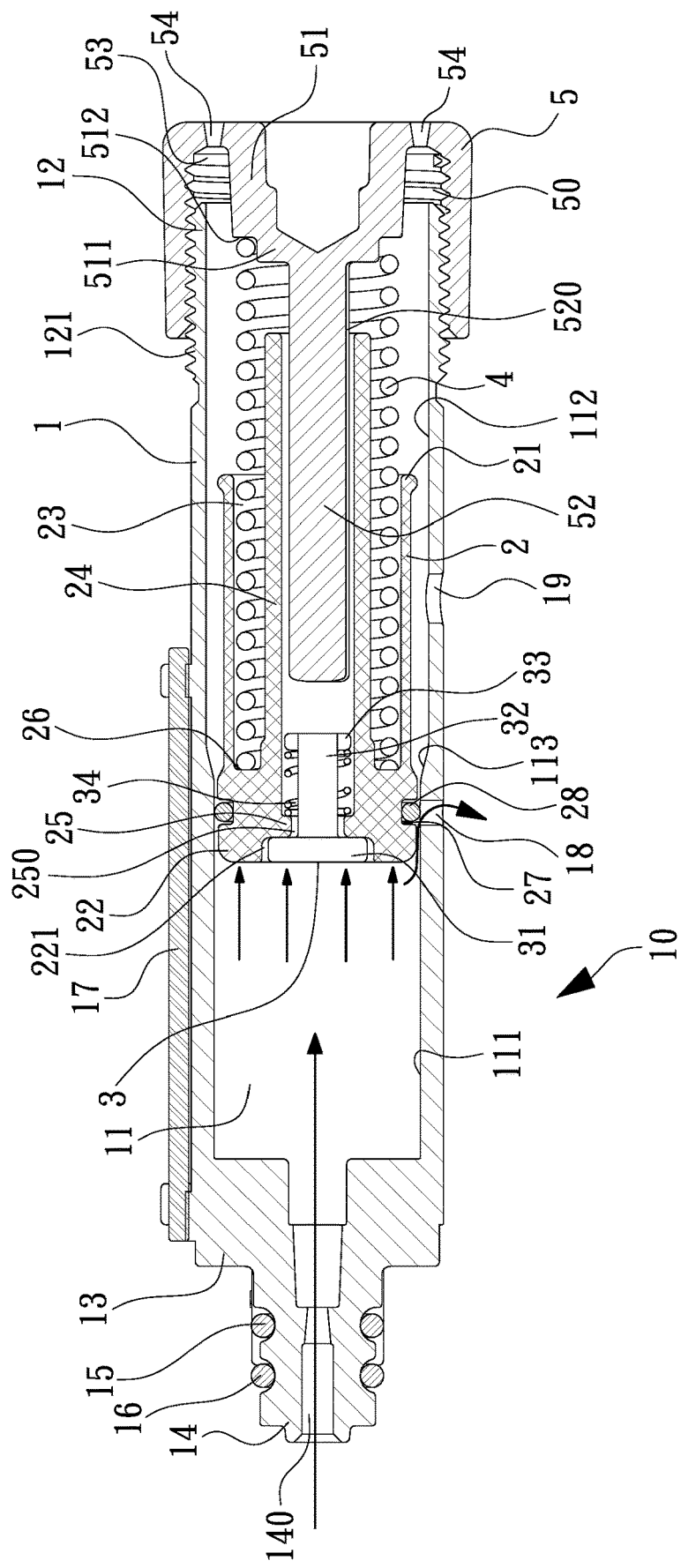
FIG. 11 is another cross sectional view showing the operation of the pressure gauge according to the first second embodiment of the present invention.
Figure 12:
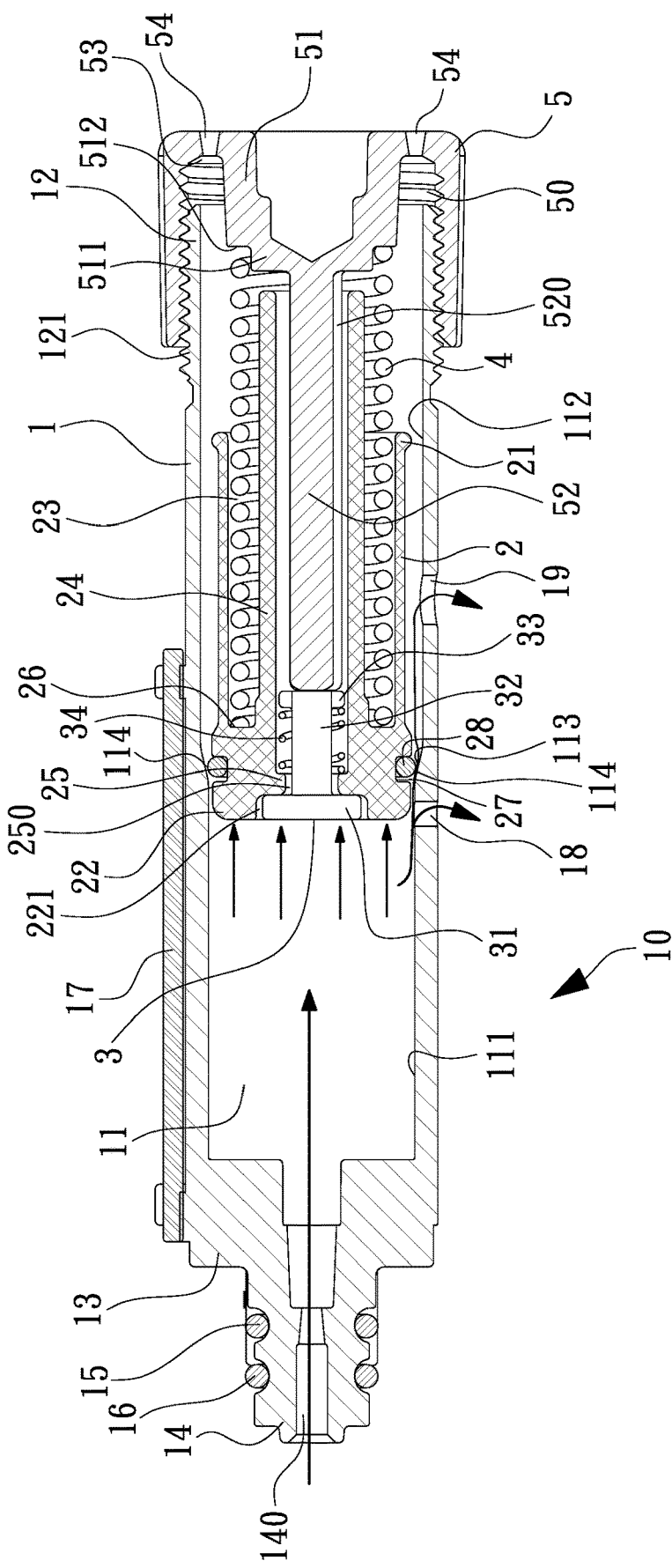
FIG. 12 is also another cross sectional view showing the operation of the pressure gauge according to the first second embodiment of the present invention.

Referring to FIGS. 1 and 11, the input pressure of the external pressure source flows into the hollow tube 1 of the pressure gauge 10 via the conduit 140 of the connector 14 to force the drive element 2 to push the driven spring 4 and to move toward the cap 5, such that the colored O-ring 28 indicates the pressure value on the at least one scale graduation of the display unit 17, and the pressure value is viewable by a user via the hollow tube 1, as shown in FIG. 6. With reference to FIG. 6, when the pressure value is more than a maximum safe value, the colored O-ring 28 of the second distal segment 22 of the drive element 2 is pushed to move across the first discharge orifice 18 of the first fixing section 111 of the hollow tube 1, the exceeded pressure of the high-pressure airs of the air compressor 9 discharges out of the first discharge orifice 18 of the pressure gauge 10, as shown in FIG. 11, and external pressure flows into the pressure gauge 10 to push the drive element 2 to move toward the cap 5, such that the colored O-ring 28 of the second distal segment 22 of the drive element 2 moves across the surround section 113 so that the exceeded pressure of the high-pressure airs of the air compressor 9 flows into the second fixing section 112 along a gap 114 between the colored O-ring 28 and the surround section 113 in 360 degrees and discharges out of the first discharge orifice 18 and the second discharge orifice 19 of the second fixing section 112, as illustrated in FIG. 12. To obtain a using safety, the discharge valve 3 on the air channel 250 is pushed by the push bolt 52 when the driving element 2 is moved toward a maximum moving position so that the high-pressure airs of the pressure gauge 10 discharges out of the first discharge orifice 18, the second discharge orifice 19, and the multiple passages 54 via the trough 221, the air channel 250, the hollow extension 24, the recess 520 of the push bolt 52, the accommodation chamber 11 of the hollow tube 1, and the trench 53 of the cap 5, as shown in FIG. 13. When overpressure produces in an inflating process of the air compressor, the hollow extension 24 of the driving element 2 contacts with the shoulder 511 of the cap 5 so as to avoid a deformation of the driven spring 4.

Figure 14:
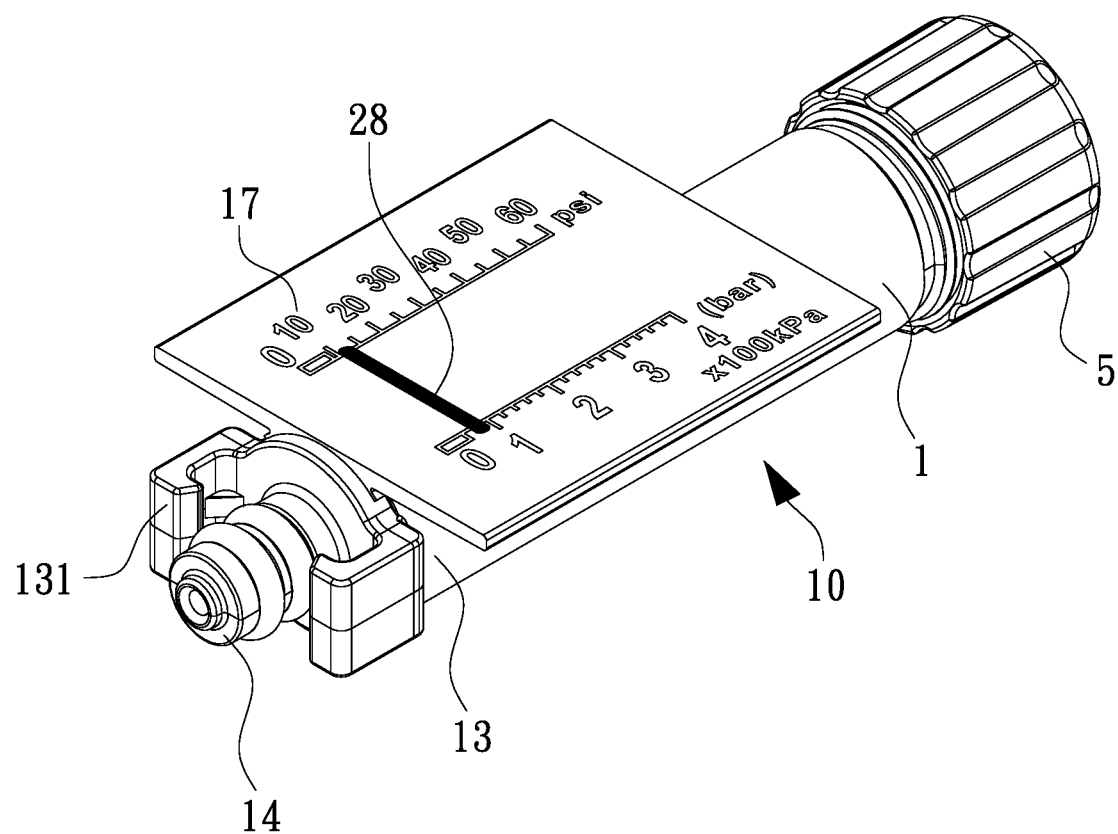
FIG. 14 is a perspective view showing the assembly of a pressure gauge according to a second embodiment of the present invention.

With reference to FIG. 14, in a second embodiment, a display unit 17 is one-piece formed with a hollow tube 1 to form a pressure gauge 10.

Thereby, after the air compressor 9 is connected with the pressure gauge 10 having the protection unit and the driving element 2 of the pressure gauge 10 is forced in different pressure values, wherein when the different pressure values is more than the maximum safe value, the exceeded pressure of the high-pressure airs of the air compressor 9 discharges out of the at least one discharge orifice. When the drive element 2 of the pressure gauge 10 is pushed by the exceeded pressure of the high-pressure airs of the air compressor 9, it is discharged out of the at least one discharge orifice of the pressure gauge 10.

The discharge valve 3 on the air channel 250 of the drive element 2 is pushed by the push bolt 52 of the cap 5 when the driving element 2 of the pressure gauge 10 is moved toward the maximum moving position so that the exceeded pressure of the high-pressure airs is discharged out of the first discharge orifice 18 of the pressure gauge 10, the second discharge orifice 19, and the multiple passages 54 of the cap 5 via the air channel 250 of the drive element 2, thus eliminating a safety valve on the air compressor 9, protecting an inflated object, measuring the pressure value accurately, and avoiding the overpressure in the inflating process of the air compressor by way of the protection unit.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A pressure gauge comprising:
   a hollow tube which is transparent and is formed in a cylinder shape, and the hollow tube including an accommodation chamber, a connector fixed on a center of an outer side of a first distal segment of the hollow tube and having a conduit which communicates with the accommodation chamber of the hollow tube, a display unit mounted on an outer wall of the hollow tube adjacent to the first distal segment and having at least one scale graduation to indicate a pressure value of an air compressor;
   a drive element including a protection unit and being accommodated in the hollow tube so as to be movable linearly after being pushed by compressed air of the air compressor, such that the pressure value is indicated by using a length of movement of the drive element, the drive element including a first open segment formed on a first end of the drive element, a second distal segment formed on a second end of the drive element, a receiving portion defined in the drive element, a hollow extension extending out of the first open segment from a center of a bottom of the receiving portion of the second distal segment, and a protrusion formed on an inner wall of the hollow extension and having an air channel;
   an anti-leak spring received in the hollow extension of the drive element, wherein a first end of the anti-leak spring abuts against the protrusion, and a second end of the anti-leak spring contacts with the protection unit;
   a resilient element received in the receiving portion of the drive element and fitted on the hollow extension; and
   a cap including a seat extending from a center of an interior of the cap, a push bolt extending from a top of the seat and formed in a cross-shaped column shape, and multiple passages defined on an outer wall of the cap, wherein an end of the resilient element contacts with the cap;
   wherein the accommodation chamber of the hollow tube has a first fixing section and a second fixing section, a diameter of which is different from that of the first fixing section, the hollow tube further includes a surround section defined between the first fixing section and the second fixing section, and the hollow tube includes at least one discharge orifice defined on the hollow tube.

2. The pressure gauge as claimed in claim 1, wherein the hollow tube includes a second open segment formed on a first end of the hollow tube and having male threads, a first distal segment formed on a second end of the hollow tube and having two retainers formed on the first distal segment, and two airtight O-rings separately arranged on the connector; the hollow tube includes a central axis, a radius of the first fixing section is adjacent to the conduit, and a radius of the second fixing section is proximate to the first open segment, wherein the radius of the first section is less than a radius of the second fixing section, wherein the surround section is tilted relative to the central axis, the first discharge orifice is defined on the first fixing section adjacent to the surround section, and the second discharge orifice is defined on the second fixing section proximate to the surround section.

3. The pressure gauge as claimed in claim 2, wherein the second distal segment has a trough defined thereon, wherein the trough, the air channel, and the hollow extension communicate with one another, the drive element further includes a cavity defined between a bottom of the hollow extension and an inner wall of the drive element, a groove defined around an outer wall of the second distal segment, and a colored O-ring fitted in the groove.

4. The pressure gauge as claimed in claim 3, wherein the protection unit is a discharge valve and includes a disc formed on a first end of the discharge valve, a post extending from a second end of the discharge valve, two wings extending from an outer end of the post; wherein the second end of the discharge valve is inserted from the trough of the second distal segment of the drive element to engage with a second end of the anti-leak spring via the air channel and the anti-leak spring, and the disc of the discharge valve is moved into the trough of the second distal segment, such that the anti-leak spring is fitted on the post of the discharge valve, the first end of the anti-leak spring abuts against the protrusion, and the second end of the anti-leak spring engages with the two wings of the discharge valve so that the anti-leak spring pushes the disc of the discharge valve to contact with the trough of the second distal segment matingly, and the disc closes the air channel of the drive element.

5. The pressure gauge as claimed in claim 3, wherein the resilient element is a driven spring, and an end of the driven spring contacts with the cavity.

6. The pressure gauge as claimed in claim 5, wherein the cap includes female threads formed on an inner wall thereof, a trench defined between the seat and the inner wall of the cap, the push bolt of the cap has a recess defined on an outer wall thereof and a diameter which is less than a diameter of the seat, and a shoulder is formed between the push bolt and the seat, wherein a rib is defined between the shoulder and the seat, and the multiple passages communicate with the trench of the cap to discharge the input pressure; after the female threads of cap are screwed with the male threads of the first open segment of the hollow tube, a screwing depth of the hollow tube and the cap is configured to adjust the pressure value of the air compressor, wherein the other end of the driven spring abuts against the rib of the cap, and an inner wall of the driven spring contacts with the shoulder of the cap.

7. The pressure gauge as claimed in claim 1, wherein the display unit is detachably connected with or is one-piece formed with the pressure gauge.

\* \* \* \* \*